United States Patent
Journee (12)

(10) Patent No.: US 6,481,044 B1
(45) Date of Patent: Nov. 19, 2002

(54) MOTOR VEHICLE WIPER COMPRISING A CONNECTOR WITH A SAFETY LOCK

(75) Inventor: Maurice Journee, Reilly (FR)

(73) Assignee: Paul Journee, S.A. (FR)

(*) Notice: Subject to any disclaimer, the term of this patent is extended or adjusted under 35 U.S.C. 154(b) by 0 days.

(21) Appl. No.: 09/701,346

(22) PCT Filed: May 27, 1999

(86) PCT No.: PCT/FR99/01250

§ 371 (c)(1),
(2), (4) Date: Jan. 4, 2001

(87) PCT Pub. No.: WO99/61293

PCT Pub. Date: Dec. 2, 1999

(30) Foreign Application Priority Data

May 28, 1998 (FR) .............................. 98 06726

(51) Int. Cl.[7] .................................................. B60S 1/40
(52) U.S. Cl. ................................ 15/250.32; 15/250.361
(58) Field of Search ..................... 15/250.32, 250.43, 15/250.44, 250.31, 250.361

(56) References Cited

U.S. PATENT DOCUMENTS 4,209,874 A * 7/1980 Hancu ...................... 15/250.32
4,608,728 A * 9/1986 Sumins et al. ............ 15/250.32
5,715,563 A * 2/1998 Marks ....................... 15/250.32

FOREIGN PATENT DOCUMENTS

| DE | 87 10 593 | | 12/1988 | | |
| EP | 0337042 | * | 10/1989 | .............. | 15/250.32 |
| EP | 0459867 | * | 12/1991 | .............. | 15/250.32 |
| FR | 2 417 417 | | 9/1979 | | |
| FR | 2 700 309 | | 7/1994 | | |
| GB | 2125691 | * | 3/1984 | .............. | 15/250.32 |

* cited by examiner

Primary Examiner—Gary K. Graham
(74) Attorney, Agent, or Firm—J. Gordon Lewis

(57) ABSTRACT

A motor vehicle wiper articulated on a wiper arm by a connector provided with a sliding lock co-operating with a transverse element of the blade for fixing the connector on the blade. The lock includes a control plate capable of elastic deformation along a direction perpendicular to the lock sliding direction and bears means for blocking the lock which, when the lock is free in the locking position, co-operate with matching means integral with the blade for blocking the lock, and, further, when the control plate is deformed, are released from the matching means for enabling the lock to slide.

6 Claims, 2 Drawing Sheets

MOTOR VEHICLE WIPER COMPRISING A CONNECTOR WITH A SAFETY LOCK

BACKGROUND

The invention concerns a motor vehicle wiper having a safety lock.

The invention more specifically concerns a motor vehicle windshield wiper of the type in which the wiper blade is articulated at a free end of a wiper arm by means of a connector which straddles a blade connection portion and which is provided with two parallel longitudinal wings between which a transverse element extends. The connector has a lock that slides between an unlocked position and a locked position in which it cooperates with the transverse element of the blade in order to ensure the attachment of the connector on the blade, and the lock having an upper manipulation plate.

A windshield wiper of this type is known, for example, from FR-A-2700 309. This type of wiper is particularly advantageous in that it makes easy mounting and removal of the wiper blade possible even by a user with little experience.

SUMMARY

The invention aims to propose a new improved design of the sliding lock which makes it possible to further increase the reliability of the catching thus brought about without increasing its complexity or cost.

For this purpose, the invention proposes a windshield wipe of the initially described type characterized by the fact that the upper manipulation plate is elastically deformable in a direction perpendicular to the sliding direction of the lock, and by the fact that the upper manipulation plate carries a means of immobilizing the lock that, when the lock is in the free state in a locked position, cooperates with a complementary means connected to the blade in order to immobilize the lock, and that, when the plate is deformed, disengages from the complementary means in order to make possible the sliding of the lock.

According to other characteristics of the invention:
the lock has a catching means that extends downward from a bottom surface of the manipulation plate and is intended to cooperate, when the lock is in locked position, with a bottom surface of the transverse element, with the catching means carrying the means of immobilizing the lock;
the immobilization means consists of a finger with a vertical orientation, and the complementary means consists of a complementary recess in which the finger is held when the lock is in the free state;
the immobilization finger extends vertically upward from the catching means, and the recess is formed in the lower surface of the transverse element;
the upper manipulation plate comprises, at each of its longitudinal ends, a guide means for sliding the lock on the connector, and a central part of the plate, which carries the catching means and which can be vertically displaced by elastic deformation of the plate; and
in the free state, the upper plate has a cross section in the form of an arc of a circle with downward concavity.

BRIEF DESCRIPTION OF THE DRAWING

Other characteristics and advantages of the invention will appear upon reading the detailed description which follows, for whose comprehension reference will be made to the appended drawings in which.

DETAILED DESCRIPTION

Figure 1:
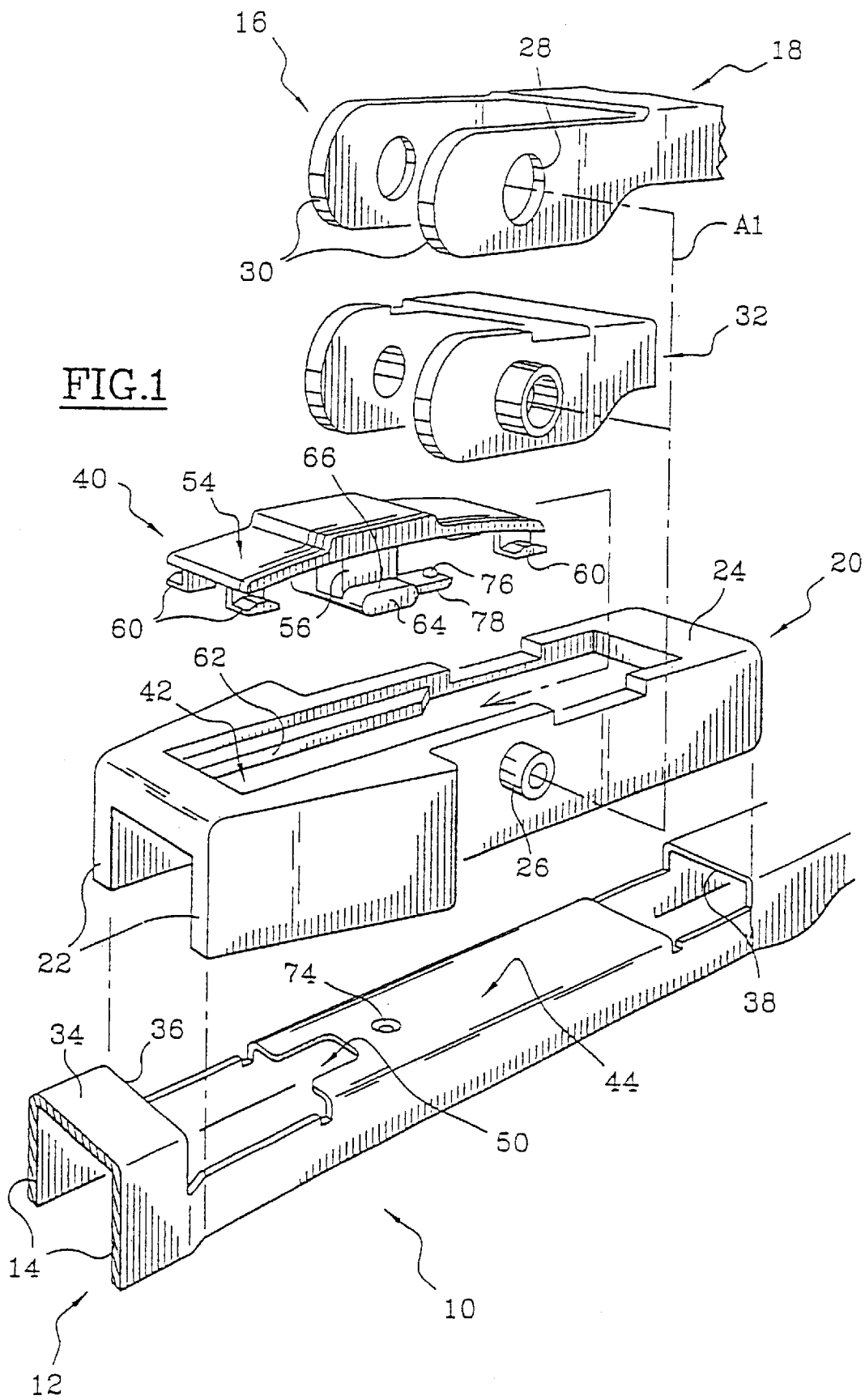
FIG. 1 is an exploded perspective view of a wiper according to the present invention.

FIG. 1 shows connection portion 10 of motor vehicle wiper blade 12. Connection portion 10 is formed, e.g., by the central portion of a main stirrup piece of blade 12. Connection portion 10 essentially has two parallel longitudinal wings 14 that run along the longitudinal direction of blade 12.

Blade 12 is intended to be mounted at free longitudinal end 16 of wiper arm 18 that has the function, on the one hand, of laying blade 12 against the glass to be wiped, and, on the other hand, of moving the blade in an alternating sweeping motion so that it moves along the glass.

Blade 12 is intended to be articulated on arm 18 by means of connector 20, which is mounted in an articulated manner so as to rotate about transverse axis Al on arm 18 and which is attached on connection portion 10 of blade 12.

Connector 20 is generally fabricated from plastic, and it essentially has two lateral flanges 22 joined by transverse upper back 24. The connector thus has the form of an upside-down U in cross section and connector 20 is intended to straddle connection portion 10 of blade 12, the two wings 14 of which are held between the two flanges 22 of connector 20.

Each of flanges 22 of connector 20 has a cylindrical trunnion 26 that extends transversely outward so that it can be held in opening 28 formed in each of two cheeks 30 of free end 16 of arm 18. The two cheeks 30 are longitudinally parallel and form a fork, and flanges 22 of connector 20 are held transversely between the two cheeks 30.

Trunnions 26 therefore ensure the mounting of connector 20 so that it can rotate with respect to arm 18. In the embodiment example illustrated in FIG. 1, intermediate piece 32 is interposed between connector 20 and free end 16 of arm 18 in order to limit operating play and, at the same time, to reduce the wear and tear and noise which can result from the relative movement of connector 20 with respect to arm 18.

In a known manner, connector 20 has some means for ensuring its close attachment to connection portion 10 of blade 12.

As can be seen in FIG. 1, the stirrup piece of blade 12 has transverse upper back 34 which connects the two wings 14 outside of connection portion 10, which is therefore delimited longitudinally by two transverse edges 36, 38 of back 34.

In order to ensure the complete immobilization of connector 20 with respect to arm 12, it is therefore sufficient to prevent any movement of upward vertical withdrawal of connector 20 from connection portion 10.

For this purpose, connector 20 has sliding lock 40 which is mounted so that it can slide in opening 42 formed in upper back 24 of connector 20. Lock 40 is intended to cooperate with transverse element 44, which connects the two wings 14 of connection portion 10.

In this embodiment example of the invention, transverse element 44 of blade 12 is produced in a single piece with wings 14 of connection portion 10.

Transverse element 44 is in the form of a horizontal plate that connects the two upper longitudinal edges of wings 14 over a part of the length of connection portion 10.

Moreover, transverse element 44 has longitudinal slot 50 that extends longitudinally over approximately three-quarters of its length and that opens longitudinally into front edge 52 of transverse element 44. Slot 50 is formed to be symmetrical with respect to the center of the two wings 14 along the transverse direction.

Sliding lock 40 essentially has approximately horizontal upper manipulation plate 54, from the bottom surface of which extends vertical foot 56, which, when connector 20 is mounted on connection portion 10 of blade 12, extends between the two wings 14 of blade 12.

At its lower end, foot 56 has two opposing protuberances 64 that extend transversely outward.

Figure 2:
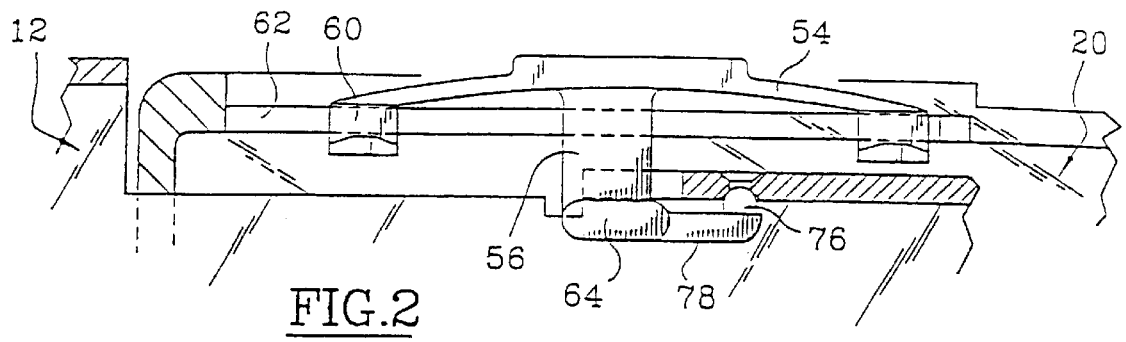
FIG. 2 is a longitudinal cross section of the wiper of FIG. 1, with the lock in a locked position.

Lock 40 is intended to slide with respect to connector 20 and with respect to blade 12 between a moved-forward unlocked position, in which at least protuberances 64 are arranged longitudinally ahead of front edge 52 of transverse element 44, and a moved-back locked position, in which foot 56 is arranged across slot 50, with protuberances 64 arranged below the level of transverse element 44. Thus, as can be seen in FIG. 2, upper surfaces 66 of protuberances 64 vertically face lower surfaces 68 of transverse element 44 which are arranged transversely on both sides of slot 50, preventing any withdrawal upward of the connector 20 and lock 40 assembly with respect to blade 12.

Furthermore, longitudinally, immediately behind slot 50, transverse element 44 has hole 74 that is intended to hold finger 76 that extends vertically at the free end of horizontal bar 78 that extends longitudinally towards the rear from a lower end of foot 56, approximately in the same horizontal plane as protuberances 64. As can be seen in FIG. 2, when the connector is moved back in the locked position, finger 76 of bar 78 engages with hole 74 in order to ensure the immobilization of lock 40. In contrast, as can be seen in FIG. 4, when the lock is in moved-forward unlocked position, bar 78 and its finger 76 are arranged vertically facing slot 50, which ensures the possibility of mounting or removal of connector 20 and of its lock 40 with respect to blade 12 by simple vertical displacement.

According to the teachings of the invention, the passage of lock 40 from its locking position to its unlocked position cannot occur unintentionally.

In effect, bar 78 is relatively rigid so that when finger 76 engages with hole 74, lock 40 cannot move forward toward its unlocked position.

Figure 3:
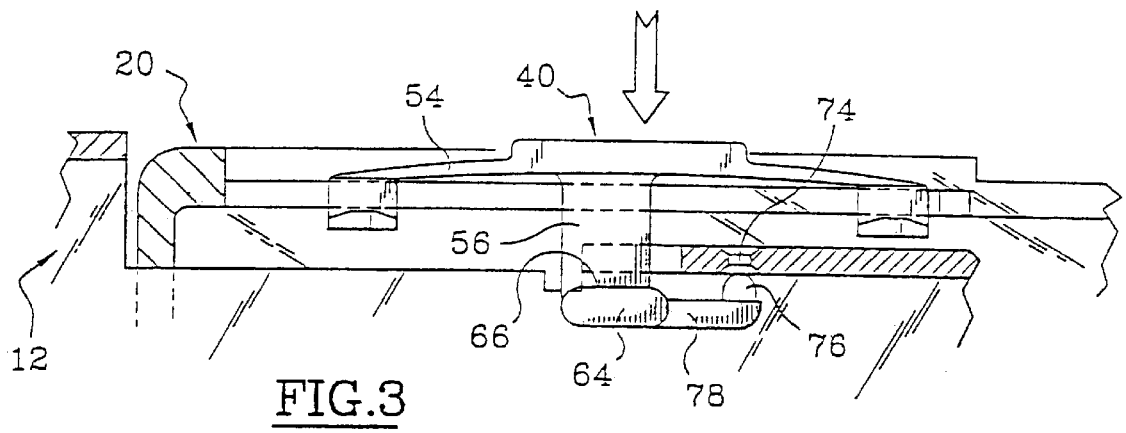
FIG. 3 is a view similar to that of FIG. 2, of the lock when its manipulation plate is deformed.
Figure 4:
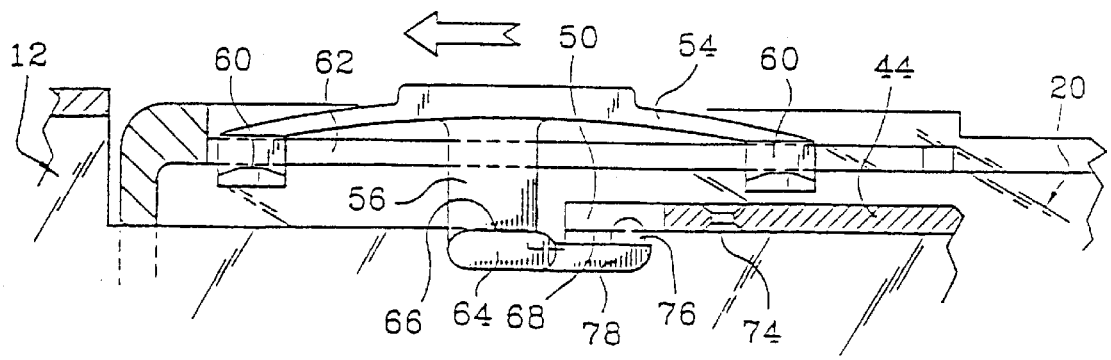
FIG. 4 is a view similar to that of FIG. 3, with the lock in unlocked position.

In contrast, it is provided that the upper manipulation plate of lock 40 is elastically deformable between a free position illustrated in FIGS. 2 and 4 and a deformed position illustrated in FIG. 3.

In its free state, manipulation plate 54 extends approximately in the form of an arc of circle with downward concavity so that it cooperates with guide rails 62, which form the longitudinal edges of opening 42 of connector 20, only at its two longitudinal ends. As can be seen particularly in FIG. 1, manipulation plate 54 of lock 40 in effect has, at each of its longitudinal ends, a means 60 guiding its longitudinal sliding along rails 62 of connector 20, without preventing the vertical displacement of the central part of plate 54 when it is deformed.

The central part of manipulation plate 54, from which catching foot 56 extends downward, therefore at that time extends above the level of its two longitudinal ends, so that foot 56 occupies a high position with respect to blade 12. In this position, when lock 40 is in the locked position, finger 76 is completely engaged in hole 74, as can be seen in FIG. 2.

In contrast, as represented in FIG. 3, when the user compresses plate 54 by pressing vertically downward on its central portion, a flattening of plate 54 occurs, so that catching foot 56 is brought towards a low position with respect to blade 12. With horizontal bar 78 connected to the lower end of catching foot 56, finger 76 is then disengaged vertically downward from hole 74.

Once finger 76 disengages, the user can then make lock 40 slide forward toward its unlocked position illustrated in FIG. 4.

This design of lock 40 makes it possible to ensure that lock 40 cannot accidentally go from its locked position to its unlocked position, even under the effect of intense vibration or of impact from an object.

In the embodiment of the invention, the immobilization of lock 40 is only provided in its locked position. However, it is also possible, without deviating from the scope of the invention, that lock 40 be immobilized in its unlocked position.

Likewise, it is also possible that the immobilization of lock 40 be ensured by the cooperation of an element of lock 40 with connector element 20.

What is claimed is:

1. A motor vehicle windshield wiper of the type which has a wiper blade articulated at a free end of a wiper arm by means of a connector which straddles a connection portion of the blade provided with two parallel longitudinal wings between which a transverse element extends, and which the connector has a lock mounted thereon for sliding between an unlocked position and a locked position in which it cooperates with the transverse element of the blade in order to ensure the attachment of the connector on the blade, and in which the lock has an upper manipulation plate, characterized in that the upper manipulation plate is elastically deformable in a direction perpendicular to the sliding direction of the lock and in that the upper manipulation plate carries a means of immobilization of the lock, which, when the lock is in a free state in the locked position, cooperates with a complementary means connected to the blade in order to immobilize the lock, and which, when the plate is deformed, disengages from the complementary means in order to make possible the sliding of the lock.

2. The wiper according to claim 1, characterized in that the lock has a catching means that extends downward from a bottom surface of the manipulation plate and that is intended to cooperate, when the lock is in the locked position, with a bottom surface of the transverse element, and in that the catching means carries a means of immobilization of the lock.

3. The wiper according to claim 2, characterized in that the immobilizing means consists of a finger with a vertical orientation, and that the complementary means consists of a complementary recess in which the finger is held when the lock is in the free state.

4. The wiper according to claim 3, characterized in that the finger extends vertically upward from the catching means, and in that the recess is formed in the bottom surface of the transverse element.

5. The wiper according to claim 2 characterized in that the upper manipulation plate has longitudinal ends, at each of its longitudinal ends, a means for guiding the sliding of the lock on the connector, and in that a central part of the plate, which carries the catching means can be vertically displaced by elastic deformation of the plate.

6. The wiper according to claim 5, characterized in that in the free state, the upper plate has a cross section in the form of an arc of a circle with downward concavity.

* * * * *